United States Patent
Yamazaki

(10) Patent No.: US 7,206,799 B2
(45) Date of Patent: Apr. 17, 2007

(54) MODULAR MULTIPLICATION METHOD AND CALCULATING DEVICE

(75) Inventor: Hiroshi Yamazaki, Miyazaki (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 591 days.

(21) Appl. No.: 10/282,107

(22) Filed: Oct. 29, 2002

(65) Prior Publication Data

US 2003/0200246 A1    Oct. 23, 2003

(30) Foreign Application Priority Data

Apr. 19, 2002  (JP)  .............................. 2002-117364

(51) Int. Cl.
*G06F 7/38*  (2006.01)
*H04K 1/00*  (2006.01)

(52) U.S. Cl. ........................................ 708/491; 380/28

(58) Field of Classification Search ................ 708/491; 380/28, 30

See application file for complete search history.

(56) References Cited

U.S. PATENT DOCUMENTS 5,513,133 A * 4/1996 Cressel et al. ............... 708/620
6,415,310 B1 * 7/2002 Takenaka et al. ............ 708/491
6,697,831 B2 * 2/2004 Cookman et al. ........... 708/491

FOREIGN PATENT DOCUMENTS

| JP | 11-212456 | 8/1999 |
|---|---|---|
| JP | 2000-132376 | 5/2000 |
| JP | 2001-51832 | 2/2001 |

OTHER PUBLICATIONS

"Hardware Implementation of Montgomery's Modular Multiplication Algorithm" by Stephen E. Eldridge and Colin D. Walter, IEEE in 1993.

* cited by examiner

*Primary Examiner*—Chuong D. Ngo
(74) *Attorney, Agent, or Firm*—Rabin & Berdo, PC

(57) ABSTRACT

To provide a modular multiplication method and a calculating device that do not rely on the Montgomery technique, wherein the number of times of multiply-add calculations is reduced to shorten a calculation time for calculation speedup, there is no limitation in input value, and it is possible to execute a remainder calculation exceeding the calculable maximum bit length of a multiply-add unit that is used. Assuming that $N=2^n-M$ and $X=\alpha \times 2^n+\beta$, a relation of $X \bmod N = (\alpha \times M + \beta) \bmod N$ is derived, which is utilized. n represents a maximum bit number where "1" is assigned in N, a solution of $2^{n+1} \bmod N$ is set as b, $A \times B$ is set as X, $X \bmod N$ is transferred to $(X/2^{n+1} \times b + X \bmod 2^{n+1}) \bmod N$ and further transferred to $(X \cdot n/2^{n+1} \times b + X \cdot n \bmod 2^{n+1}) \bmod N$, calculations of $X \cdot n/2^{n+1} \times b + X \cdot n \bmod 2^{n+1}$ are repeated until a bit length of $X \cdot n$ becomes $n+1$, $X \cdot n - N$ is derived and a derived result is set as a solution of "$A \times B \bmod N$".

9 Claims, 1 Drawing Sheet

MODULAR MULTIPLICATION METHOD AND CALCULATING DEVICE

BACKGROUND OF THE INVENTION

1. Field of the Invention

The present invention relates to information encryption and decryption techniques for use in those fields such as information network, transportation, finance, medical treatment and distribution, and in particular, relates to a modular multiplication method and a calculating device for realizing information encryption and decryption.

2. Description of the Related Art

Following the development of the information communication technique, it has been taken seriously to ensure the security on an information network, e.g. prevent a fraudulent use or destruction of data. As a result, the information encryption and decryption techniques are now being used not only in the information communication field, but also in those familiar fields such as transportation, finance, medical treatment and distribution. Therefore, the encryption and decryption techniques of this type are required to process the high-level security at high speeds.

In the encryption and decryption techniques, "asymmetrical encryption algorithm" is excellent in quality. The asymmetrical encryption algorithm represents an encryption algorithm wherein an encryption key and a decryption key differ from each other, and it is not easy to calculate one of them from the other.

As typical asymmetrical encryption algorithms, there have been available, for example, RSA (named from initials of three creators) encryption, ElGamal encryption, Rabin encryption and Williams encryption of the type that uses a modular multiplication. Further, there have been available systems of "digital signature" employing those encryption algorithms, and there is now a movement to standardize them. Typical ones subjected to the standardization are an RSA signature method, ElGamal signature method, Schnorr signature method, DSA (Digital Signature Algorithm) signature method and the like. All of them are of the type that uses a modular multiplication of a long bit length. Therefore, for realizing those digital signature systems, it is indispensable to develop a calculating method and device that can complete the long bit-length modular multiplication in a short time.

The foregoing RSA encryption, ElGamal encryption, Rabin encryption and Williams encryption use as a basis a form of modular multiplication given by an expression "A×BmodN". This expression represents deriving a remainder when A×B is divided by N. In the encryption (decryption), A represents a "plaintext" subjected to encryption (decryption), and B and N represent "keys" for encryption (decryption).

When executing encryption and decryption of information using the modular multiplication, decoding of each key can be made difficult by elongating bit lengths of A, B and N. On the other hand, if the bit lengths of A, B and N are elongated, a long time is required for processing the modular multiplication. Thus, it is an important problem how to process the modular multiplication with the long bit lengths of A, B and N at a high speed.

Montgomery has proposed a system for obtaining a solution of a remainder calculation (mod calculation) by carrying out multiplication and simple bit string processing. Prior art using this Montgomery technique is described in, for example, JP-A-11-212456, JP-A-2000-132376 and JP-A-2001-51832.

The modular multiplication algorithm according to the Montgomery technique uses a modulus N(N>1) of remainder and a base R that is relatively prime with the modulus N of remainder and is greater than N. And, it utilizes the fact that a calculation of X×R'modN from a dividend X can be performed only by carrying out a division by the base R.

In this case, each of N, N', R, R' and X is an integer, and the dividend X satisfies a relation of $0 \leq X < R \times N$. Further, R' is an inverse number (inverse value) of the base R on the modulus N of remainder, and a relation of R×R'−N×N'=1 ($0 \leq R' < N$, $0 \leq N' < R$) is satisfied.

When using a power of 2 as the base R, the division by the base R can be replaced with a shift operation in a binary notation calculation. Therefore, the calculation of X→X×R'modN can be processed at a high speed using an electronic calculating device.

First, with respect to a relation of M, R and N, $$M \cdot N = ((X \bmod R) \cdot N' \bmod R) \cdot N$$
$$\equiv X \cdot N \cdot N' \bmod R$$
$$\equiv X \cdot (R \cdot R' - 1) \bmod R$$
$$\equiv X \cdot R \cdot R' \bmod R - X \bmod R$$
$$\equiv -X \bmod R$$

From the foregoing result, $$X + M \cdot N \equiv X + (-X \bmod R)$$
$$\equiv 0 \bmod R$$

From this expression, it is proved that a remainder of the division of X+M·N by R is "0", i.e. X+M·N is divisible by R.

An algorithm Y=REDC(X) of X→X×R'modN is realized as follows.

Y=REDC(X)
M=(XmodR)×N'modR
Y=(X+M·N)/R
If Y≧N then Y=Y−N
   Y<N then return Y

In one-time REDC calculation as noted above, a remainder XmodN is not obtained, but X×R'modN is obtained. In order to obtain the remainder XmodN, the REDC calculation is again carried out in the following manner using the product of REDC(X) and $R^2$modN that has been previously obtained.

$$REDC(REDC(x) \times (R^2 \bmod N)) = (X \times R' \bmod N) \times (R^2 \bmod N) \times R' \bmod N$$
$$= X \times R' \times R^2 \times R' \bmod N$$
$$= X \bmod n$$

In this manner, the remainder XmodN can be obtained. Here, the Montgomery algorithm is extended to the modular multiplication "A×BmodN". In the normal form of a modular multiplication f(x), $$f(x) = A \times B \bmod N$$

but, in case of a remainder calculation f'(x) according to the Montgomery technique, $$f'(x) = A \times B \times R' \bmod N$$

First, as "precalculation", N', RmodN and R2modN are calculated, wherein R represents a power of 2 slightly greater than the modulus N, R' represents an inverse value of R in a modN calculation (i.e. R×R'modN=1), and N' represents an inverse value of N in the Montgomery technique (i.e. R×R'−N×N'=1) and 0<N'<R.

Then, setting calculated $R^2 \bmod N$ as B, $$A \times B \times R' \bmod N$$

is calculated and set as A. Then, $$A \times B \times R' \bmod N$$

is further calculated and set as A. Through the foregoing procedure, A×BmodN is obtained.

As described above, according to the algorithm of the Montgomery technique, the modular multiplication can be executed without using the division by N.

However, there have been the following problems in the algorithm according to the conventional Montgomery technique. Specifically, since, as described above, "precalculation" is necessary for calculating N', RmodN and $R^2 \bmod N$ from the N value, the number of times of multiply-add calculations is large and thus a long calculation time is required. For example, if a multiply-add unit is used as a hardware resource in the conventional Montgomery technique, the number of times of required calculations is as follows.

It is assumed that the number of "1" in N when expressed in binary notation is m. For calculating N', m-time multiply-add calculations are necessary. For calculating RmodN, one-time subtraction of R−N is necessary. For calculating $R^2 \bmod N$, approximately 30-time multiply-add calculations are necessary. Further, for calculating A×B×R'modN, 3-time multiply-add calculations are necessary.

From the foregoing, assuming that the N value has an n-bit length and "1" is assigned to all the bits (m=n), the total number of times of calculations required in the conventional Montgomery technique includes (n+33)-time multiply-add calculations and one-time subtraction.

Further, in the algorithm according to the conventional Montgomery technique, there are two input limitations, i.e. the N value is an odd number and the most significant bit of a designated bit length is "1".

Moreover, it is impossible to carry out a modular multiplication exceeding the calculable maximum number of bits of a multiply-add unit that is used as hardware.

SUMMARY OF THE INVENTION

The present invention provides a modular multiplication method and a calculating device that are new and do not rely on the Montgomery technique, wherein (1) the number of times of multiply-add calculations is reduced to shorten a calculation time for calculation speed-up, (2) there is no limitation in input value, and (3) it is possible to execute a remainder calculation exceeding the calculable maximum bit length of a multiply-add unit used as hardware.

The modular multiplication in the present invention employs the following two formulas.

$$(X_1 + X_2) \bmod N = ((X_1 \bmod N) + (X_2 \bmod N)) \bmod N \quad (1)$$

$$X \bmod N = a((X/a) \bmod (N/a)) \quad (2)$$

First, assuming that $N = 2^n - M$ and $X = \alpha \times 2^n + \beta$, the following equation $$X \bmod N = (\alpha \times M + \beta) \bmod N$$

is derived from the foregoing formula (1). The reason is $$\begin{aligned}
X \bmod N &= (\alpha x 2^n + \beta) \bmod N \\
&= (\alpha x(M+N) + \beta) \bmod N \\
&= (\alpha xM + \alpha xN + \beta) \bmod N \\
&= (\alpha xM + \beta) \bmod N + \alpha xN \bmod N) \bmod N \\
&\text{here, } N \bmod N = 0 \\
&= ((\alpha xM + \beta) \bmod N) \bmod N \\
&= (\alpha xM + \beta) \bmod N
\end{aligned}$$

By repeatedly calculating $\alpha \times M + \beta$ in the right side of the equation, the bit width converges. By making use of this nature, the following modular multiplication method for "A×BmodN" according to the present invention is constituted.

Specifically, the modular multiplication method for deriving a solution of "A×BmodN" according to the present invention comprises a first step of setting a maximum bit number where "1" is assigned in N as n, deriving $2^{n+1} \bmod N$ and setting a solution thereof as b, a second step of deriving A×B and setting a solution thereof as X, a third step of transferring XmodN to $$(X/2^{n+1} \times b + X \bmod 2^{n+1}) \bmod N$$

a fourth step of transferring $$(X/2^{n+1} \times b + X \bmod 2^{n+1}) \bmod N$$

to $$(X \cdot n/2^{n+1} \times b + X \cdot n \bmod 2^{n+1}) \bmod N$$

and repeating calculations of $$X \cdot n/2^{n+1} \times b + X \cdot n \bmod 2^{n+1}$$

until a bit length of X·n becomes n+1, and a fifth step of deriving X·n−N and setting a derived result as the solution of "A×BmodN".

With this arrangement, (1) the number of times of multiply-add calculations can be reduced to shorten a calculation time for calculation speed-up, (2) the input value limitation can be eliminated, and (3) it is possible to execute a remainder calculation exceeding the calculable maximum bit length of a multiply-add unit used as hardware.

DESCRIPTION OF THE PREFERRED EMBODIMENTS

Figure 1:
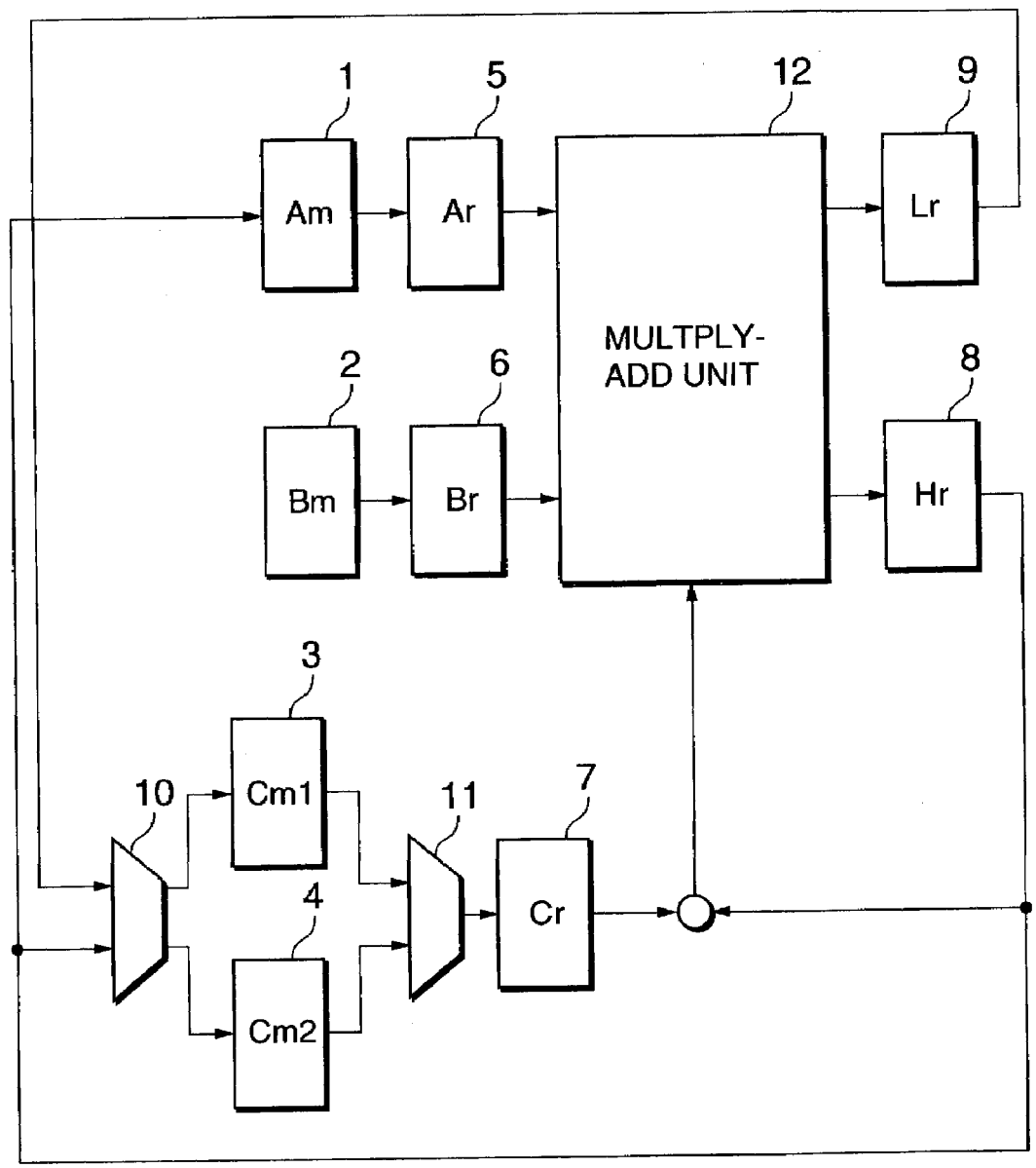
FIG. 1 is a block diagram showing an example of a structure of a multiply-add calculating device for carrying out modular multiplications according to first to third preferred embodiments of the present invention.

Now, preferred embodiments of the present invention will be described hereinbelow with reference to the accompanying drawing.

[First Embodiment]

In the first embodiment, a solution of "A×BmodN" is derived according to the following procedure. First, a maximum bit number where "1" is assigned in N is set as n. Then, $2^{n+1}modN$ is derived and a solution thereof is set as b (first step).

Then, A×B is derived and a solution thereof is set as X (second step).

Then, XmodN is transferred to $(X/2^{n+1} \times b + Xmod2^{n+1})modN$ (third step).

Then, $(X/2^{n+1} \times b + Xmod2^{n+1})modN$ is transferred to $(X \cdot n/2^{n+1} \times b + X \cdot nmod2^{n+1})modN$ and calculations of $X \cdot n/2^{n+1} \times b + X \cdot nmod2^{n+1}$ are repeated until a bit length of X·n becomes n+1 (fourth step).

Finally, X·n−N is derived and a derived result is set as the solution of "A×BmodN" (fifth step).

With this arrangement, (1) the number of times of multiply-add calculations can be reduced to shorten a calculation time for calculation speed-up, and (2) the input value limitation can be eliminated. In the first embodiment, (3) it is possible to execute a remainder calculation exceeding the calculable maximum bit length of a multiply-add unit used as hardware.

FIG. 1 is an example of a structural diagram of a multiply-add calculating device for carrying out the procedure of the first embodiment. The multiply-add calculating device comprises four 32×n-bit memories, i.e. an Am memory 1, a Bm memory 2, a Cm1 memory 3 and a Cm2 memory 4, three 32-bit registers, i.e. an Ar register 5, a Br register 6 and a Cr register 7, a 32-bit multiply-add unit 12, two 32-bit registers, i.e. an Hr register 8 and an Lr register 9 for storing calculation results of the multiply-add unit 12, and two selectors 10 and 11.

When calculating A×B+C, the multiply-add calculating device operates as follows. First, an A value, a B value and a C value are stored into the Am memory 1, the Bm memory 2 and the Cm1 memory 3, respectively. Data of each memory is blocked per 32 bits, which is expressed as follows.

$Am$ memory={$Am(n), Am(n-1), \ldots, Am(2), Am(1)$}

$Bm$ memory={$Bm(n), Bm(n-1), \ldots, Bm(2), Bm(1)$}

$Cm1$ memory={$Cm1(n), Cm1(n-1), \ldots, Cm1(2), Cm1(1)$}

Then, data of Am(1) is transferred from the Am memory 1 to the Ar register 5. Similarly, data of Bm(1) and data of Cm1(1) are transferred from the Bm memory 2 and the Cm1 memory 3 to the Br register 6 and the Cr register 7, respectively.

Then, a 32-bit multiply-add calculation of Ar×Br+Cr is performed in the multiply-add unit 12. Lower data of a result of the calculation is stored into the Lr register 9, while upper data thereof is stored into the Hr register 8. Further, the contents of the Lr register 9 are stored into the Cm2 memory 4, while the contents of the Hr register 8 are overwritten in Cm1(1) of the Cm1 memory 3.

Then, using the Ar, Br and Cr registers,

Am(1)×Bm(2)+Cm1(2)

...

Am(1)×Bm(n−1)+Cm1(n−1)

Am(1)×Bm(n)+Cm1(n)

are calculated in sequence, and the contents of the Hr register 8 are overwritten in the Cm1 memory 3 upon every occasion.

Then, Am(2)×Bm(1)+Cm1(1) is calculated. The contents of the Lr register 9 of a result of the calculation are stored into Cm2(2) of the Cm2 memory 4. Then, Am(2)×Bm(2)+Cm1(2)

...

Am(2)×Bm(n−1)+Cm1(n−1)

Am(2)×Bm(n)+Cm1(n)

are calculated in sequence, and the contents of the Hr register 8 are overwritten in the Cm1 memory 3 upon every occasion.

Finally, Am(n)×Bm(1)+Cm1(1) is calculated. The contents of the Lr register 9 of a result of the calculation are stored into Cm2(n) of the Cm2 memory 4. Then, Am(n)×Bm(2)+Cm1(2)

...

Am(n)×Bm(n−1)+Cm1(n−1)

Am(n)×Bm(n)+Cm1(n)

are calculated in sequence, and the contents of the Hr register 8 are overwritten in the Am memory 1 upon every occasion. Accordingly, lower data of the final solution is stored into the Cm2 memory 4, while upper data thereof is stored into the Am memory 1.

The next calculation is carried out by the Am memory 1×Bm memory 2×Cm2 memory 4. In the next calculation, lower data of the final solution is stored into the Cm2 memory 4, while upper data thereof is stored into the Am memory 1. The Cm1 memory 3 and the Cm2 memory 4 are used alternately per calculation.

In the first embodiment, if the multiply-add calculating device of FIG. 1 is used, the calculation of A×B in the second step can be performed by calculating it while storing the A value into the Am memory 1 and the B value into the Bm memory 2, and clearing the Cm1 memory 3. On the other hand, the calculation of $X/2^{n+1} \times b + Xmod2^{n+1}$ in the third step can be performed by calculating it while storing upper data of the X value into the Am memory 1, b into the Bm memory 2 and lower data of the X value into the Cm1 memory 3.

On the other hand, the calculation of $X \cdot n/2^{n+1} \times b + X \cdot nmod2^{n+1}$ in the fourth step can be performed by calculating it while storing upper data of X·n into the Am memory 1 and lower data of X·n into the Cm1 memory 3 and the Cm2 memory 4 alternately. Then, until a bit length of X·n becomes n+1, the calculation of $X \cdot n/2^{n+1} \times b + X \cdot nmod2^{n+1}$ is repeated.

According to the first embodiment, assuming that a bit length of each of A, B and N of "A×BmodN" is n bits, the number of times of calculations is as follows. The second step requires one-time multiply-add calculation. In the fourth step, the bit length of X·n is reduced by one bit per one-time calculation. Accordingly, from $2n-n=n$, the fourth step requires n-time multiply-add calculations. The first and fifth steps each require one-time subtraction. Therefore, when the bit length of "A×BmodN" is n bits, (n+1)-time multiply-add calculations and two-time subtractions are required in the first embodiment. Thus, as compared with the multiply-add calculations according to the conventional Montgomery technique, the number of times of calculations is largely reduced. Further, in the first embodiment, there is no limitation in N value.

[Second Embodiment]

In the second embodiment, a solution of "A×BmodN" is derived according to the following procedure. First, a maximum bit number where "1" is assigned in N is set as n. Then, $2^{n+1}$modN is derived and a solution thereof is set as b (first step).

Then, A×B is derived and a solution thereof is set as X (second step).

Then, $2^{n+m}$modN is transferred to $$(2^{n+m}/2^{n+1} \times b + 2^{n+m} \bmod 2^{n+1}) \bmod N$$

and a solution thereof is set as b·m (third step).

Then, XmodN is transferred to $$(X \cdot n/2^{n+m} \times b \cdot m + X \cdot n \bmod 2^{n+m}) \bmod N$$

and calculations of $$X \cdot n/2^{n+m} \times b \cdot m + X \cdot n \bmod 2^{n+m}$$

are repeated until a bit length of X·n becomes n+m, and a solution thereof is set as X' (fourth step).

Then, X'modN is transferred to $$(X' \cdot n/2^{n+1} \times b + X' \cdot n \bmod 2^{n+1}) \bmod N$$

and calculations of $$X' \cdot n/2^{n+1} \times b + X' \cdot n \bmod 2^{n+1}$$

are repeated until a bit length of X'·n becomes n+1 (fifth step).

Finally, X'·n−N is derived and a derived result is set as the solution of "A×BmodN" (sixth step).

Like in the first embodiment, the multiply-add calculating device of FIG. 1 can also be used in the second embodiment. According to the second embodiment, assuming that a bit length of each of A, B and N of "A×BmodN" is n bits, the number of times of calculations is as follows.

The second step requires one-time multiply-add calculation. The third step requires m-time multiply-add calculations. The fourth step requires n/m-time multiply-add calculations. The fifth step requires m-time multiply-add calculations. The first, third and sixth steps each require one-time subtraction, thus three-time subtractions in total. Therefore, when the bit length of "A×BmodN" is n bits, (n/m+2m+1)-time multiply-add calculations and three-time subtractions are required in the second embodiment.

Assuming that n+1>n/m+2m+1, since n>1 and m>1, if n satisfies $n>2m^2/(m-1)$, the number of times of calculations in the second embodiment is further reduced as compared with the first embodiment. For example, assuming that n=1024 and m=32, the first embodiment requires 1025-time multiply-add calculations, while the second embodiment requires only 96-time multiply-add calculations. Further, also in the second embodiment, there is no limitation in N value.

[Third Embodiment]

In the third embodiment, a solution of "A×BmodN" is derived according to the following procedure. First, a maximum bit number where "1" is assigned in N is set as s. Then, $2^{s+1}$modN is derived and a solution thereof is set as b (first step).

Then, A×B is derived and a solution thereof is set as X (second step).

Then, a bit length of X is set as n(n>s). Since X can not be subjected to a multiply-add calculation as it is, X is transferred to $$X_H \times 2^{n-s} + X_L (n-s<s)$$

and, based on this, XmodN is transferred to $$(X_H \times 2^{n-s} + X_L) \bmod N$$

and further transferred to $$((X_H \times 2^{n-s} + X_L) + (X_L \bmod N)) \bmod N$$

Since a bit length of each of $X_H$ and $2^{n-s}$ is no greater than s bits, $X_H \times 2^{n-s}$ is calculable by the multiply-add unit, and a solution thereof is set as $X_H'$ (third step).

Then, $X_H'$modN is transferred to $$(X_H'/2^{s+1} \times b + X_H' \bmod 2^{s+1}) \bmod N$$

and multiply-add calculations are repeated until a bit length of $X_H'$ becomes s+1, and a solution thereof is set as $b_H$ (fourth step).

Then, $X_L$modN is derived by subtraction. Since a bit length of $X_L$ is no greater than s bits, a solution can be derived by subtraction. The solution is set as $b_L$ (fifth step).

Finally, $(b_H+b_L)$modN is derived and a derived result is set as the solution of "A×BmodN" (sixth step).

As described above, according to the third embodiment, even if a bit length of X in the remainder calculation "XmodN" exceeds the calculable maximum bit length of a multiply-add calculating device used as a hardware resource, it can be dealt with.

Like in the first embodiment, the multiply-add calculating device of FIG. 1 can also be used in the third embodiment. According to the third embodiment, assuming that the calculable maximum bit length of the multiply-add calculating device of FIG. 1 is s bits, and a bit length of each of A, B and N of "A×BmodN" is n bits, the number of times of calculations is as follows.

The fourth step requires (n−s)-time multiply-add calculations. The sixth step requires one-time multiply-add calculation. The first, fourth, fifth and sixth steps each require one-time subtraction, thus four-time subtractions in total. Therefore, when the calculable maximum bit length of the multiply-add calculating device of FIG. 1 is s bits and the bit length of "A×BmodN" is n bits, (n−s+1)-time multiply-add calculations and four-time subtractions are required in the third embodiment. Further, also in the third embodiment, there is no limitation in N value.

Although explanation has been made of the preferred embodiments of the modular multiplication methods and the calculating device of the present invention with reference to the drawing, the present invention is not limited thereto. It is clear that a person skilled in the art can easily reach various modifications and corrections without departing from the principle of the invention as defined in the appended claims, and it is understood that those modifications and corrections also belong to the technical scope of the present invention as a matter of course.

What is claimed is:

1. A method for deriving a solution of "A×BmodN" during encryption or decryption, said method comprising:
    a first step of setting a maximum bit number where "1" is assigned in N as n, deriving $2^{n+1} \bmod N$ and setting a solution thereof as b;
    a second step of deriving A×B and setting a solution thereof as X;
    a third step of transferring XmodN to $(X/2^{n+1} \times b + X \bmod 2^{n+1}) \bmod N;$ a fourth step of transferring $(X/2^{n+1} \times b + X \bmod 2^{n+1}) \bmod N$ to $(X \cdot n/2^{n+1} \times b + X \cdot n \bmod 2^{n+1}) \bmod N$ and repeating calculations of $X \cdot n/2^{n+1} \times b + X \cdot n \bmod 2^{n+1}$ until a bit length of X·n becomes n+1;
    a fifth step of deriving X·n−N and setting a derived result as the solution of "A×BmodN"; and
    a sixth step of using the solution during encrption of a plaintext message into an encrypted message or during decryption of an encrypted message into a plaintext message.

2. The method of claim 1, wherein the first to fifth steps are performed with a multiply-add calculating device, the device including an Am memory, a Bm memory, a Cm1 memory and a Cm2 memory each blocked per given bits and storing A value data, B value data and C value data, respectively; an Ar register, a Br register and a Cr register for receiving data from said Am, Bin, Cm1 and Cm2 memories, respectively; a multiply-add unit for calculating Ar×Br+Cr based on data stored in the Ar, Br and Cr registers; an Hr register for storing upper bits of a result of the calculation by said multiply-add unit, and an Lr register for storing lower bits thereof; and two selectors disposed on an input and an output side of said Cm1 memory and Cm2 memory for controlling an input/output relative to said Cm1 memory or Cm2 memory.

3. The method of claim 2, further comprising the steps of
    storing the contents of the Lr register in the Cm2 memory or Cm1 memory, and in the Am memory,
    storing the contents of the Hr register in the Cm1 memory or Cm2 memory, and
    using the Cm1 memory and the Cm2 memory alternately per calculation.

4. The method of claim 3, wherein A×B+C is calculated by the multiply-add calculating device by performing the following steps:
    a. first, storing an A value, a B value and a C value in the Am memory, the Bm memory and the Cm1 memory, respectively;
    b. blocking data of each memory per 32 bits, which can be expressed as $Am$ memory=$\{Am(n), Am(n-1), \ldots, Am(2), Am(1)\}$, $Bm$ memory=$\{Bm(n), Bm(n-1), \ldots, Bm(2), Bm(1)\}$, and $Cm1$ memory=$\{Cm1(n), Cm1(n-1), \ldots, Cm1(2), Cm1(1)\}$;

c. then transferring data of Am(1) from the Am memory to the Ar register;
    d. transferring data of Bm(1) and data of Cm1 (1) from the Bm memory and the Cm1 memory to the Br register and the Cr register, respectively;
    e. then, performing a 32-bit multiply-add calculation of Ar×Br+Cr in the multiply-add unit
    f. storing lower data of a result of the calculation of step d in the Lr register, and storing upper data thereof in the Hr register;
    g. storing the contents of the Lr register in the Cm2 memory,
    h. overwriting the contents of the Hr register in Cm1 (1) of the Cm1 memory,
    i. then, using the Ar, Br and Cr registers, calculating $Am(1) \times Bm(2) + Cm1(2)$, $Am(1) \times Bm(n-1) + Cm1(n-1)$, and $Am(1) \times Bm(n) + Cm1(n)$ in sequence, while overwriting the contents of the Hr register in the Cm1 memory upon every occasion;
    j. then calculating Am(2)×Bm(1)+Cm1(1) and storing the contents of the Lr register of a result of the calculation in Cm2(2) of the Cm2 memory;
    k. then calculating $Am(2) \times Bm(2) + Cm1(2)$, $Am(2) \times Bm(n-1) + Cm1(n-1)$, and $Am(2) \times Bm(n) + Cm1(n)$ in sequence, and overwriting the contents of the Hr register in the Cm1 memory upon every occasion;
    l. then calculating Am(n)×Bm(1)+Cm1(1) and storing the contents of the Lr register of a result of the calculation in Cm2(n) of the Cm2 memory;
    m. then, calculating $Am(n) \times Bm(2) + Cm1(2)$, $Am(n) \times Bm(n-1) + Cm1(n-1)$, and $Am(n) \times Bm(n) + Cm1(n)$ in sequence, and overwriting the contents of the Hr register in the Am memory upon every occasion, wherein lower data of the final solution is stored in the Cm2 memory, while upper data thereof is stored into the Am memory; and
    n. carrying out the next calculation by the Am memory 1 ×Bm memory 2 ×Cm2 memory, wherein lower data of the final solution is stored in the Cm2 memory, while upper data thereof is stored in the Am memory, using the Cm1 memory and the Cm2 memory alternately per calculation.

5. The method of claim 4, wherein A×B is calculated in the second step while storing the A value into the Am memory and the B value into the Bm memory, and clearing the Cm1 memory.

6. The method of claim 5, wherein the calculation of $X/2^{n+1} \times b + X \bmod 2^{n+1}$ is performed in the third step while storing upper data of the X value into the Am memory, storing b into the Bm memory, and lower data of the X value into the Cm1 memory.

7. The method of claim 6, wherein the calculation of $X \cdot n/2^{n+1} \times b + X \cdot n \bmod 2^{n+1}$ in the fourth step is performed while storing upper data of X·n into the Am memory and storing lower data of X·n into the Cm1 memory and the Cm2 memory alternately, and then repeating the calculation of $X \cdot n/2^{n+1} \times b + X \cdot n \bmod 2^{n+1}$ until a bit length of $X \cdot n$ becomes $n+1$.

8. The method of claim 3, wherein the calculation of $X/2^{n+1} \times b + X \bmod 2^{n+1}$ is performed in the third step while storing upper data of the X value into the Am memory, storing b into the Bm memory, and lower data of the X value into the Cm1 memory.

9. The method of claim 3, wherein the calculation of $X \cdot n/2^{n+1} \times b + X \cdot n \bmod 2^{n+1}$ in the fourth step is performed while storing upper data of $X \cdot n$ into the Am memory and storing lower data of $X \cdot n$ into the Cm1 memory and the Cm2 memory alternately, and then repeating the calculation of $X \cdot n/2^{n+1} \times b + X \cdot n \bmod 2^{n+1}$ until a bit length of $X \cdot n$ becomes $n+1$.

* * * * *